United States Patent
Ferguson et al.

(10) Patent No.: US 8,527,114 B2
(45) Date of Patent: Sep. 3, 2013

(54) SILENT KEY START CLIMATE CONTROL DEMAND

(75) Inventors: Russell William Ferguson, Ypsilanti, MI (US); Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 13/034,984

(22) Filed: Feb. 25, 2011

(65) Prior Publication Data

US 2011/0166734 A1    Jul. 7, 2011

(51) Int. Cl.
*G05D 1/00* (2006.01)

(52) U.S. Cl.
USPC .................................. 701/2; 701/36

(58) Field of Classification Search
USPC ........................................ 701/2, 36
See application file for complete search history.

(56) References Cited

U.S. PATENT DOCUMENTS

| | | | |
|---|---|---|---|
| 5,791,407 A | 8/1998 | Hammons | |
| 6,745,582 B1 | 6/2004 | Urbank et al. | |
| 6,885,285 B2 | 4/2005 | Losey | |
| 7,055,340 B2 | 6/2006 | Umebayashi et al. | |
| 7,258,092 B2 | 8/2007 | Beaucaire et al. | |
| 8,112,185 B2* | 2/2012 | Wu ................................... | 701/2 |
| 2004/0178050 A1* | 9/2004 | Wylde ......................... | 200/61.88 |
| 2008/0114501 A1* | 5/2008 | Wu ................................... | 701/2 |
| 2008/0117079 A1 | 5/2008 | Hassan | |
| 2009/0146813 A1* | 6/2009 | Nuno ........................... | 340/572.1 |
| 2009/0193825 A1* | 8/2009 | Hara ................................ | 62/132 |
| 2010/0072290 A1* | 3/2010 | Dage ................................ | 236/51 |
| 2010/0231037 A1* | 9/2010 | Esaka et al. ................... | 307/9.1 |
| 2010/0235046 A1* | 9/2010 | Proefke et al. ................. | 701/36 |
| 2011/0047981 A1* | 3/2011 | Roos et al. ..................... | 60/286 |
| 2011/0102139 A1* | 5/2011 | Girard et al. ................. | 340/5.61 |
| 2011/0197844 A1* | 8/2011 | Matsubara .................. | 123/179.2 |
| 2012/0029733 A1* | 2/2012 | Lazzara ........................... | 701/2 |

FOREIGN PATENT DOCUMENTS

JP          11062793          3/1999

OTHER PUBLICATIONS

Boa Remote Start (Model 165B); http://www.boasecurity.com/rs.asp; retrieved Apr. 8, 2009; 1 Page.
Climate Control with Remote Start; http://www.dieselplace.com/forum/showthread.php?p=2916810; retrieved Apr. 8, 2009; 5 Pages.
Honda Remote Starter; Unique to Honda Remote Starters; http://www.bernardiparts.com/HondaRemoteStarter.aspx; retrieved Apr. 8, 2009; 3 Pages.
Valet Remote Start System for Vehicle Check It Out!; https://www.bidtopia.com/detail.aspx?id=548469; retrieved Apr. 8, 2009; 4 Pages.

* cited by examiner

Primary Examiner — Hussein A. Elchanti
(74) Attorney, Agent, or Firm — David B. Kelley; Brooks Kushman P.C.

(57) ABSTRACT

A hybrid electric vehicle includes an internal combustion engine, a high voltage traction battery, an electric motor powered by the traction battery, an electric air conditioning (AC) system, and a controller. The controller is programmed to start the vehicle. The vehicle is started by, if a climate control demand requires cooling: (a) if a vehicle start request is a remote start request, starting the engine; (b) if the vehicle start request is a local start request, avoiding starting the engine to provide a silent start.

20 Claims, 3 Drawing Sheets

SILENT KEY START CLIMATE CONTROL DEMAND

BACKGROUND

1. Technical Field

The invention relates to hybrid electric vehicles. The invention further relates to silent key start, and to meeting climate control demands by the operator during silent key start.

2. Background Art

The use of mild and full hybrid electric vehicles is becoming widespread. A mild hybrid electric vehicle includes an integrated starter-generator (ISG). The ISG is used by an engine start-stop system. The engine start/stop system for a vehicle stops the internal combustion engine when the vehicle is stopped, and then starts the internal combustion engine when the driver requests acceleration. The engine also may be started, for example, due to loads on the electrical system or due to the catalyst temperature being low. For example, the internal combustion engine may be stopped when the vehicle stops at traffic lights or stops in a traffic jam. This approach is known as static start/stop. The stopping of the engine when the engine is not needed improves fuel economy, and reduces emissions. Although, sometimes, the engine may stay on when the vehicle is stopped because the alternator needs to run due to loads on the electrical system, or the engine may stay on for other reasons such as, for example, when the catalyst temperature is too low. In some approaches, fuel economy may be improved by 3-4% with static start/stop.

The ISG of the mild hybrid may also be utilized for regenerative braking, and may provide electric support drive assistance to the internal combustion engine. The mild hybrid, however, does not provide exclusive or full electric mode driving, which is the distinguishing feature from a full hybrid electric vehicle.

A feature related to start-stop systems and hybrid electric vehicles is silent key start. With silent key start, the internal combustion engine is not started when the key is turned on.

Some hybrid electric vehicles only charge the traction battery by running the internal combustion engine. Other hybrid electric vehicles are known as plugin hybrids, and allow the vehicle to be plugged into an electrical power source as a way to charge the traction battery.

Another feature of many modern vehicles is remote start. A remote start system allows the operator to start the vehicle remotely. Typically, this is done for climate control purposes. For example, an operator may remotely start the vehicle to heat or cool the vehicle interior prior to driving.

With the introduction of silent key start, remote start, plugin hybrids, or a combination of these, there is an issue with meeting the climate control demands with the internal combustion engine off, even if the ignition key is on or the vehicle has been remotely started.

For the foregoing reasons, there is a need for an approach to meeting climate control demands by the operator during silent key start.

SUMMARY

It is an object of the invention to provide an improved approach to implementing silent key start wherein climate control demands by the operator are addressed.

In one embodiment, a method of controlling a hybrid electric vehicle is provided. The vehicle includes an internal combustion engine, a high voltage traction battery, and an electric motor powered by the traction battery. The vehicle includes an electric air conditioning (AC) system. The method comprises starting the vehicle.

Starting the vehicle comprises if a climate control demand requires cooling: (a) if a vehicle start request is a remote start request, starting the engine; (b) if the vehicle start request is a local start request, avoiding starting the engine to provide a silent start.

Various additional features are also comprehended by embodiments of the invention. Any embodiments of the invention may include one or more of the additional features, depending on the application.

The method may further comprise detecting the vehicle start request from the operator; and determining the climate control demand from the operator. Further, the method may further comprise starting the vehicle by, if the climate control demand requires cooling and the vehicle start request is a remote start request, starting the engine to provide feedback to the operator and then stopping the engine.

For example, starting the vehicle may further comprise if the climate control demand requires heating, starting the engine, and cycling the engine on and off as needed to meet the climate control demand. In another example, the method further comprises upon detecting the vehicle start request from the operator, when the vehicle start request is a local start request, waiting a limited amount of time to allow the operator to adjust the climate control demand, and then determining the climate control demand from the operator. Upon detecting the vehicle start request from the operator, when the vehicle start request is a remote start request, the climate control demand from the operator may be immediately determined.

The method may further comprise, in an embodiment wherein the vehicle is a plugin hybrid electric vehicle, starting the vehicle by, if the climate control demand requires cooling and the vehicle start request is a remote start request and the vehicle is not plugged in, starting the engine to maintain a state of charge of the traction battery.

Starting the vehicle may further comprise if the climate control demand requires cooling and the vehicle start request is a remote start request and the vehicle is not plugged in, cycling the engine on and off as needed to maintain a state of charge of the traction battery while meeting the climate control demand. Starting the vehicle may further comprise if the climate control demand requires heating and the vehicle is plugged in, starting the engine.

In another feature, the method further comprises preventing driving of the vehicle when the vehicle is plugged in and the engine has been started. In yet another feature, starting the vehicle further comprises if the climate control demand requires heating and the vehicle is plugged in, cycling the engine on and off as needed to meet the climate control demand.

In another embodiment, a hybrid electric vehicle comprises an internal combustion engine, a high voltage traction battery, and an electric motor powered by the traction battery. The vehicle further comprises an electric air conditioning (AC) system, and a controller.

The controller is programmed to start the vehicle. Starting the vehicle comprises if a climate control demand requires cooling: (a) if a vehicle start request is a remote start request, starting the engine; (b) if the vehicle start request is a local start request, avoiding starting the engine to provide a silent start.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the invention comprise a set of strategies which meet the intent of the operator's climate control needs. Several examples are described, and others are possible. The particulars of the examples are not intended to limit the invention.

In one particular strategy related to silent key start: when the climate controls are activated such that required heating or cooling of the vehicle interior space is assumed, then the internal combustion engine will turn on to provide the energy source to heat or cool. In cases of electric AC, the engine does not require starting due to climate control cooling requirements.

A delay in the engine start may be provided to give the driver the perception of a silent key start and also give the driver an opportunity to adjust the climate controls from the state that they were in when the vehicle was shut down.

In another aspect, if the vehicle is remotely started, it can be assumed that the operator is remote starting the vehicle due to climate control reasons. In this case, if the climate control is set to heat and/or the temperature requires heat, the engine is started immediately to provide heat. This also provides remote feedback to the operator that the vehicle was started. The engine is also started if the climate control is set to cooling and the vehicle is equipped with a mechanical AC system. This also provides remote feedback to the operator that the vehicle was started. If climate control cooling is required and the vehicle is equipped with an electric AC system, the engine is not started; however, the engine may be temporarily started to provide remote feedback to the operator that the vehicle was started.

In another aspect, for plugin hybrids, these strategies also apply with certain exceptions. If the vehicle is remotely started, it may be desirable to start the engine all the time to maintain maximum battery state of charge for driving on battery only, even if the vehicle is equipped with electric AC.

Embodiments of the invention may be implemented in a variety of applications. One example is a hybrid electric vehicle powertrain.

Figure 1:
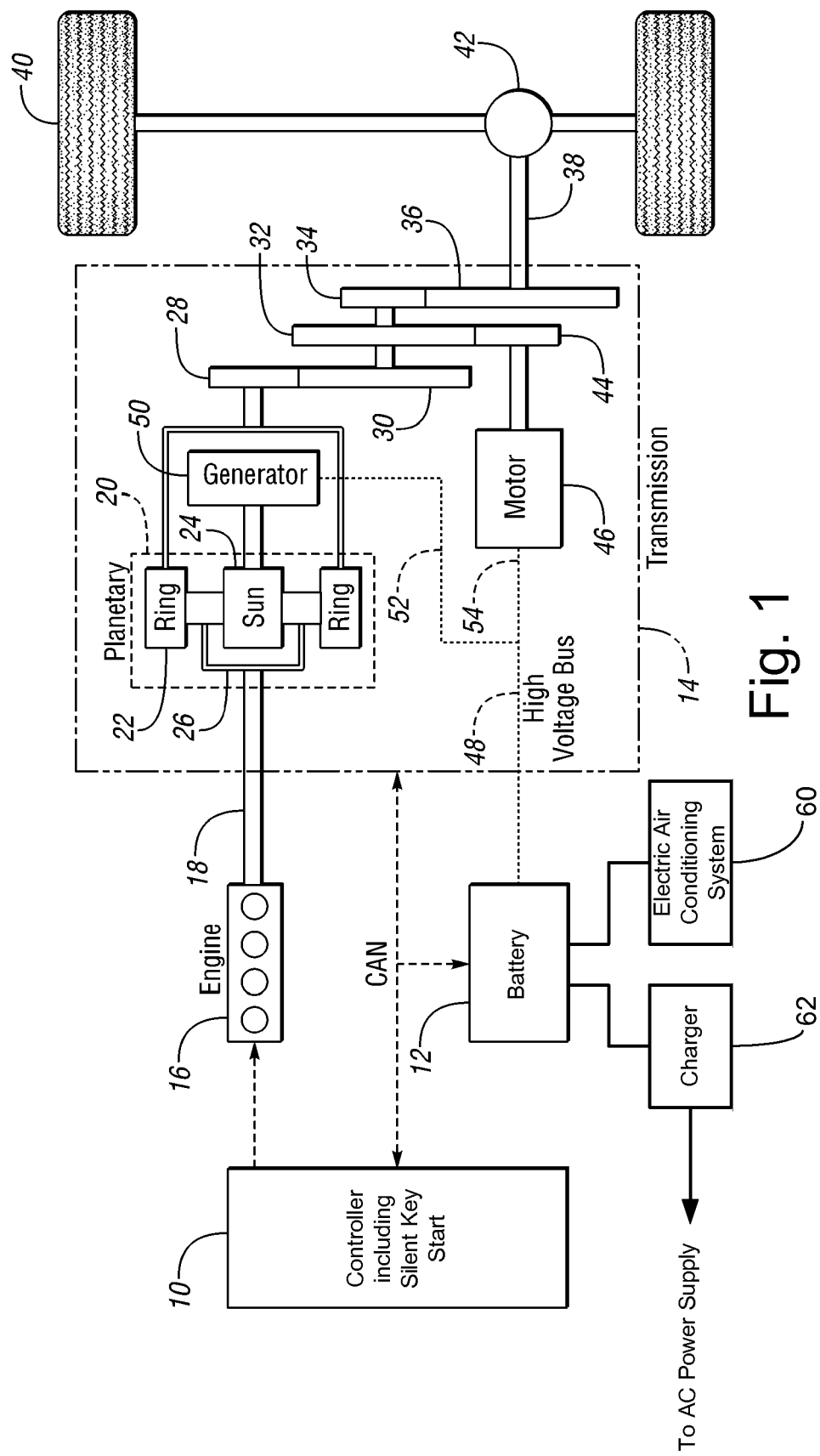
FIG. 1 is a schematic representation of a powersplit powertrain system configuration.

A hybrid electric vehicle powertrain is shown in FIG. 1. A vehicle system controller (VSC) 10 including silent key start logic, a battery and battery energy control module (BECM) 12, and a transmission 14, together with a motor-generator subsystem, comprise a control area network (CAN). An internal combustion engine 16, controlled by VSC 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34, and 36. A torque output shaft 38 for the transmission 14 is drivably connected to vehicle traction wheels 40 through a differential and axle mechanism 42.

Gears 30, 32, and 34 are mounted on a countershaft, with gear 32 engaging a motor-driven gear 44. Electric motor 46 drives gear 44, which acts as a torque input for the countershaft gearing.

The battery delivers electric power to the motor through power flow path 48, 54. Generator 50 is connected electrically to the battery and to the motor 46 in a known fashion as shown at 52.

The powersplit powertrain system of FIG. 1 may be operated in a variety of different modes as is appreciated by those skilled in the art. As shown, there are two power sources for the driveline. The first power source is a combination of the engine and generator subsystems, which are connected together using the planetary gear unit 20. The other power source involves the electric drive system including the motor 46, the generator 50, and the battery, where the battery acts as an energy storage medium for the generator 50 and the motor 46.

In general, VSC 10 calculates the total engine power needed to meet the drive wheel power demand plus all accessory loads, and independently schedules the engine speed and load operating point, with or without feedback of actual engine performance, to meet the total power demand. This type of approach is typically used to maximize fuel economy and may be used in other types of powertrain systems that have such VSCs.

Figure 2:
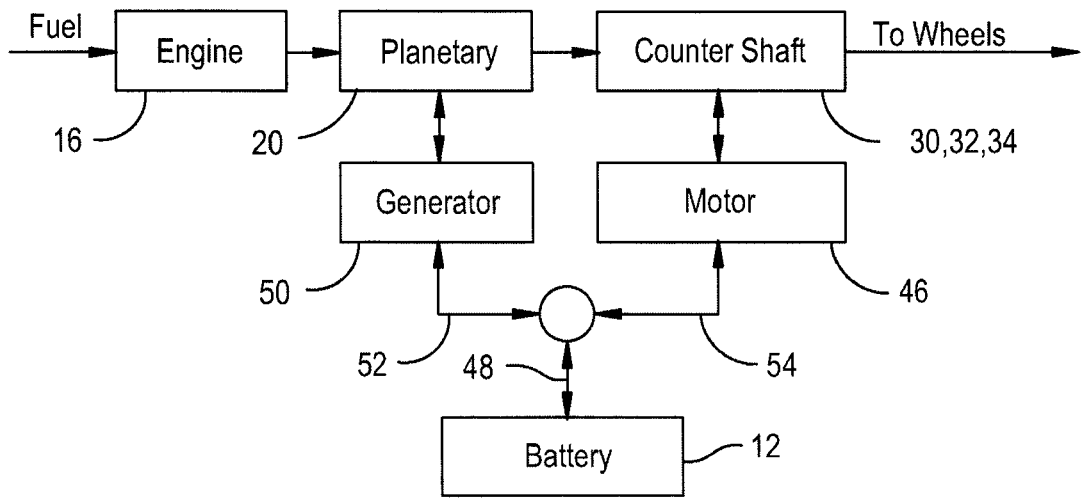
FIG. 2 is a schematic representation, in block diagram form, of a powertrain system power flow diagram.

The power flow paths between the various elements of the powersplit powertrain diagram shown in FIG. 1 are illustrated in FIG. 2. Fueling is scheduled based on driver and other inputs. Engine 16 delivers power to the planetary gear unit 20. The available engine brake power is reduced by accessory loads. Power is delivered by the planetary ring gear to the countershaft gears 30, 32, 34. Power output from the transmission drives the wheels.

Generator 50, when acting as a motor, can deliver power to the planetary gearing. When acting as a generator, generator 50 is driven by the planetary gearing. Similarly, power distribution between the motor 46 and the countershaft gears 30, 32, 34 can be distributed in either direction.

As shown in FIGS. 1 and 2, engine power output can be split into two paths by controlling generator 50. In operation, the system determines the driver's demand for torque and achieves the optimum split of power between the two power sources.

With continuing reference to FIG. 1, various approaches are taken to meet a driver's climate control demands. In general, heat may be generated by engine 16 while cooling is achieved with a mechanical AC system driven by engine 16, or an electrical AC system as depicted at 60. Also shown in FIG. 1, the hybrid vehicle may be a plugin type hybrid vehicle which includes charger 62 for connecting to a suitable alternating current (AC) power supply.

Figure 3:
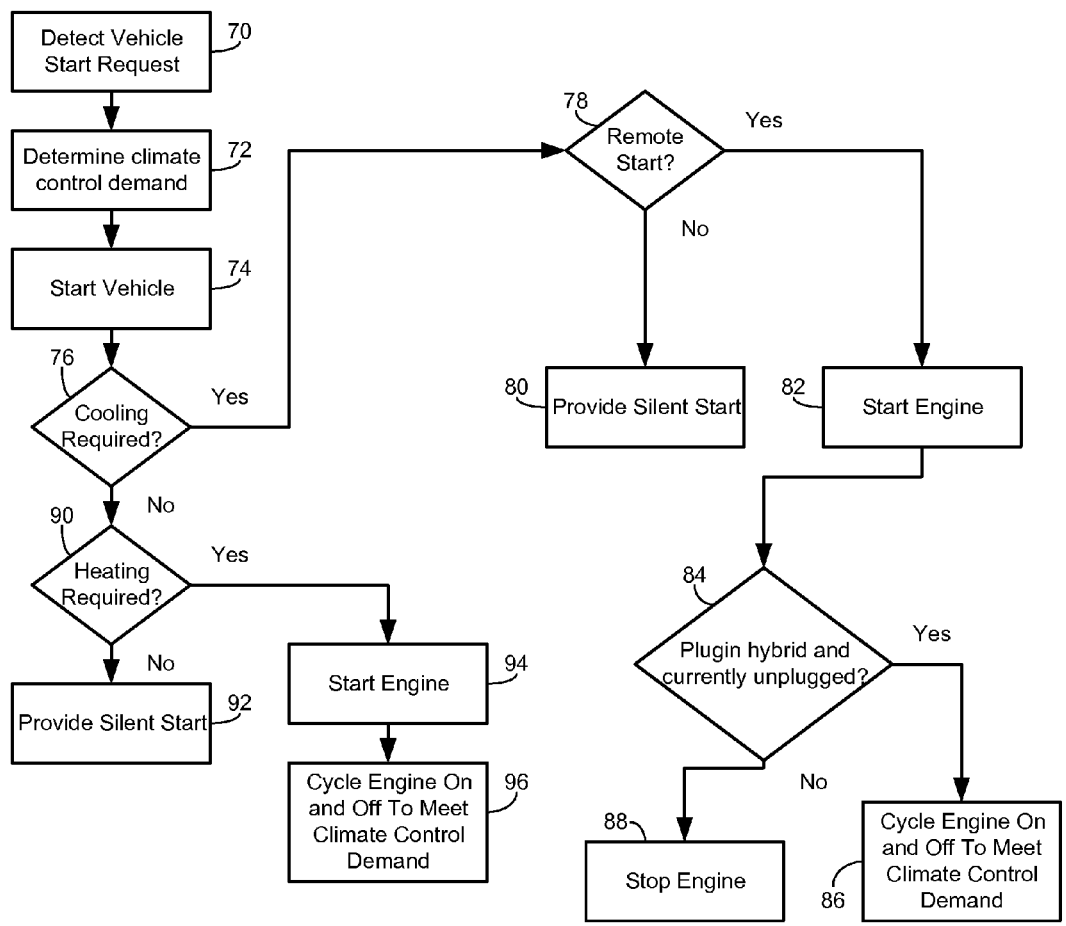
FIG. 3 is a block diagram depicting several aspects of the invention.

FIG. 3 is a block diagram depicting several aspects of the invention. In more detail, a method of controlling a hybrid electric vehicle including an electric AC system includes, at block 70, detecting a vehicle start request from the operator. At block 72, climate control demand from the operator is determined. At block 74, the vehicle is started.

If the climate control demand requires cooling (decision block 76), flow proceeds to decision block 78. If the vehicle start request is a local start request, the engine is not started and a silent start is provided at block 80. If the vehicle start request is a remote start request, the engine is started at block 82 to provide feedback to the operator.

If the hybrid electric vehicle is of the plugin type, and is currently unplugged (decision block 84), it may be desirable to cycle the engine on and off to meet the climate control demand in order to maintain maximum battery state of charge for driving on battery only even though the vehicle is equipped with an electric AC system, as indicated at block 86. Otherwise, after temporarily starting the engine to provide remote feedback to the operator, the engine may be stopped at block 88.

When cooling is not required at decision block 76, flow proceeds to decision block 90. If heating is not required a silent start is provided at block 92. When heating is required, the engine is started at block 94. As indicated at block 96, the engine may be cycled on and off to meet the climate control demands. Put another way, in general, start engine blocks 82 and 94 mean that the engine is allowed to start, as needed, to meet climate control demands.

Figure 4:
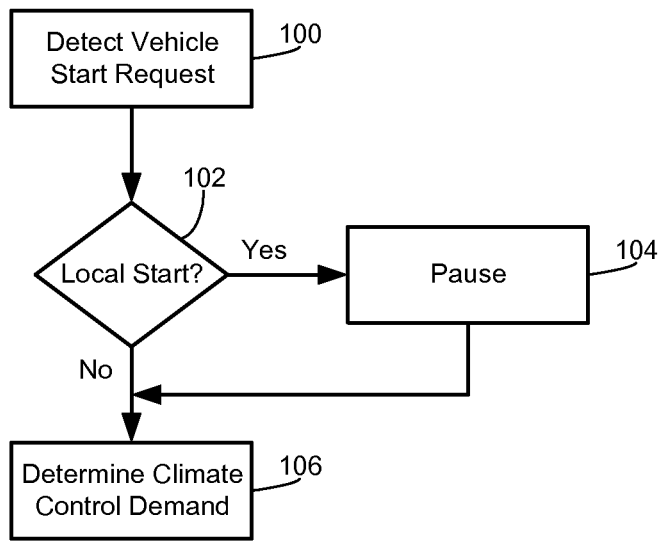
FIG. 4 is a block diagram depicting a further aspect of the invention.

FIG. 4 is a block diagram depicting a further aspect of the invention. In more detail, block 100 indicates detecting the vehicle start request from the operator. When the vehicle start request is a local start request (decision block 102), the system waits (block 104) a limited amount of time to allow the operator to adjust the climate control demand. Then, the system, at block 106 determines the climate control demand from the operator. On the other hand, when the vehicle start request is a remote start request, the climate control demand from the operator may be immediately determined at block 106.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method of controlling a hybrid electric vehicle, the vehicle including an internal combustion engine, a high voltage traction battery, an electric motor powered by the traction battery, and an electric air conditioning (AC) system, the method comprising:
   starting the vehicle by, if a climate control demand requires cooling:
      (a) if a vehicle start request is a remote start request, starting the engine;
      (b) if the vehicle start request is a local start request, avoiding starting the engine to provide a silent start.

2. The method of claim 1 further comprising:
   detecting the vehicle start request from the operator; and
   determining the climate control demand from the operator.

3. The method of claim 2 further comprising:
   starting the vehicle by, if the climate control demand requires cooling and the vehicle start request is a remote start request, starting the engine to provide feedback to the operator and then stopping the engine.

4. The method of claim 3 wherein starting the vehicle further comprises:
   if the climate control demand requires heating, starting the engine.

5. The method of claim 4 wherein starting the vehicle further comprises:
   if the climate control demand requires heating, cycling the engine on and off as needed to meet the climate control demand.

6. The method of claim 3 further comprising:
   upon detecting the vehicle start request from the operator, when the vehicle start request is a local start request, waiting a limited amount of time to allow the operator to adjust the climate control demand, and then determining the climate control demand from the operator.

7. The method of claim 6 further comprising:
   upon detecting the vehicle start request from the operator, when the vehicle start request is a remote start request, immediately determining the climate control demand from the operator.

8. The method of claim 2 wherein the vehicle is a plugin hybrid electric vehicle, the method further comprising:
   starting the vehicle by, if the climate control demand requires cooling and the vehicle start request is a remote start request and the vehicle is not plugged in, starting the engine to maintain a state of charge of the traction battery.

9. The method of claim 8 wherein starting the vehicle further comprises:
   if the climate control demand requires cooling and the vehicle start request is a remote start request and the vehicle is not plugged in, cycling the engine on and off as needed to maintain a state of charge of the traction battery while meeting the climate control demand.

10. The method of claim 8 wherein starting the vehicle further comprises:
    if the climate control demand requires heating, starting the engine.

11. The method of claim 10 wherein starting the vehicle further comprises:
    if the climate control demand requires heating, cycling the engine on and off as needed to meet the climate control demand.

12. The method of claim 8 further comprising:
    upon detecting the vehicle start request from the operator, when the vehicle start request is a local start request, waiting a limited amount of time to allow the operator to adjust the climate control demand, and then determining the climate control demand from the operator.

13. The method of claim 12 further comprising:
    upon detecting the vehicle start request from the operator, when the vehicle start request is a remote start request, immediately determining the climate control demand from the operator.

14. The method of claim 8 wherein starting the vehicle further comprises:
    if the climate control demand requires heating and the vehicle is plugged in, starting the engine.

15. The method of claim 14 further comprising:
    preventing driving of the vehicle when the vehicle is plugged in and the engine has been started.

16. The method of claim 14 wherein starting the vehicle further comprises:
    if the climate control demand requires heating and the vehicle is plugged in, cycling the engine on and off as needed to meet the climate control demand.

17. A hybrid electric vehicle comprising:
    an internal combustion engine;
    a high voltage traction battery;
    an electric motor powered by the traction battery;
    an electric air conditioning (AC) system;
    a controller programmed to:
       start the vehicle by, if a climate control demand requires cooling:
          (a) if a vehicle start request is a remote start request, starting the engine;

(b) if the vehicle start request is a local start request, avoiding starting the engine to provide a silent start.

18. The hybrid electric vehicle of claim 17 wherein the controller is further programmed to:
   detect the vehicle start request from the operator; and
   determine the climate control demand from the operator.

19. The hybrid electric vehicle of claim 17 wherein starting the vehicle further comprises:
   if the climate control demand requires cooling:
      (a) if the vehicle start request is a remote start request, starting the engine to provide feedback to the operator and then stopping the engine.

20. The hybrid electric vehicle of claim 17 wherein the vehicle is a plugin hybrid electric vehicle, wherein starting the vehicle further comprises:
   if the climate control demand requires cooling:
      (a) if the vehicle start request is a remote start request and the vehicle is not plugged in, starting the engine to maintain a state of charge of the traction battery;
      (b) if the vehicle start request is a local start request and the vehicle is not plugged in, avoiding starting the engine to provide a silent start.

\* \* \* \* \*